United States Patent
Nguyen et al.

(10) Patent No.: US 10,908,573 B2
(45) Date of Patent: Feb. 2, 2021

(54) ENGAGEMENT AND INTEGRATION PLATFORM FOR RENEWABLE ENERGY MANAGEMENT SYSTEM AND METHOD THEREOF

(71) Applicant: 17TeraWatts, Inc., Austin, TX (US)

(72) Inventors: Scott Vinh Nguyen, Austin, TX (US); Stanley Pipkin, Austin, TX (US); Matthew Alan Ross, Austin, TX (US)

(73) Assignee: 17TeraWatts, Inc., Austin, TX (US)

(*) Notice: Subject to any disclaimer, the term of this patent is extended or adjusted under 35 U.S.C. 154(b) by 0 days.

(21) Appl. No.: 16/538,535

(22) Filed: Aug. 12, 2019

(65) Prior Publication Data

US 2020/0050160 A1 Feb. 13, 2020

Related U.S. Application Data

(60) Provisional application No. 62/718,217, filed on Aug. 13, 2018.

(51) Int. Cl.
| | | |
|---|---|---|
| *H04L 29/08* | (2006.01) | |
| *G05B 19/042* | (2006.01) | |
| *G06F 3/0484* | (2013.01) | |
| *G06F 3/0481* | (2013.01) | |
| *G06F 3/0488* | (2013.01) | |

(52) U.S. Cl.
CPC ....... *G05B 19/042* (2013.01); *G06F 3/04847* (2013.01); *G05B 2219/2639* (2013.01); *G06F 3/0488* (2013.01); *G06F 3/04817* (2013.01); *H04L 67/306* (2013.01)

(58) Field of Classification Search
CPC .................. G05B 15/02; G05B 19/042; G05B 2219/2639; G06F 3/04817; G06F 3/04847; G06F 3/0488; H02J 2300/24; H02J 2300/28; H02J 2310/12; H02J 2310/52; H02J 3/004; H02J 3/14; H02J 3/38; H04L 67/306
See application file for complete search history.

(56) References Cited

U.S. PATENT DOCUMENTS

| | | | | |
|---|---|---|---|---|
| 2011/0173542 | A1* | 7/2011 | Imes | H04W 84/10 715/735 |
| 2013/0184885 | A1* | 7/2013 | Keil | G05B 23/0235 700/291 |
| 2016/0254698 | A1* | 9/2016 | Anderson | G01S 5/0284 320/101 |

OTHER PUBLICATIONS

Imane et al, Development of a Mobile Application for Home Energy Management in Smart Grids, 2015, World Congress on Sustainable Technologies (WCST-2015), School of Science and Engineering Al Akhawayn University in Ifrane Ifrane, Morocco, p. 123-129. (Year: 2015).*

(Continued)

*Primary Examiner* — Kidest Bahta

(57) ABSTRACT

A system for improving the overall performance of an energy generation system to a home includes an engagement platform, an energy generation system, an electronic device, and a home digital assistant. By drawing data across a disparate array of sources, including data from before the energy generation system is put online, the system generates and provides users and components of the energy generation system with personalized interactions, thereby effecting improvements in energy efficiency beyond those realized in behavior-agnostic control and monitoring systems.

7 Claims, 13 Drawing Sheets

(56) References Cited

OTHER PUBLICATIONS

Khaliq et al., Smart Grid Technology Integration with Smart Phones for Energy Monitoring and Management System, Sep. 2018, Proc. of the 4rth International Conference on Power Generation Systems and Renewable Energy Technologies (PGSRET), University of Engineering and Technology Lahore. (Year: 2018).*

\* cited by examiner

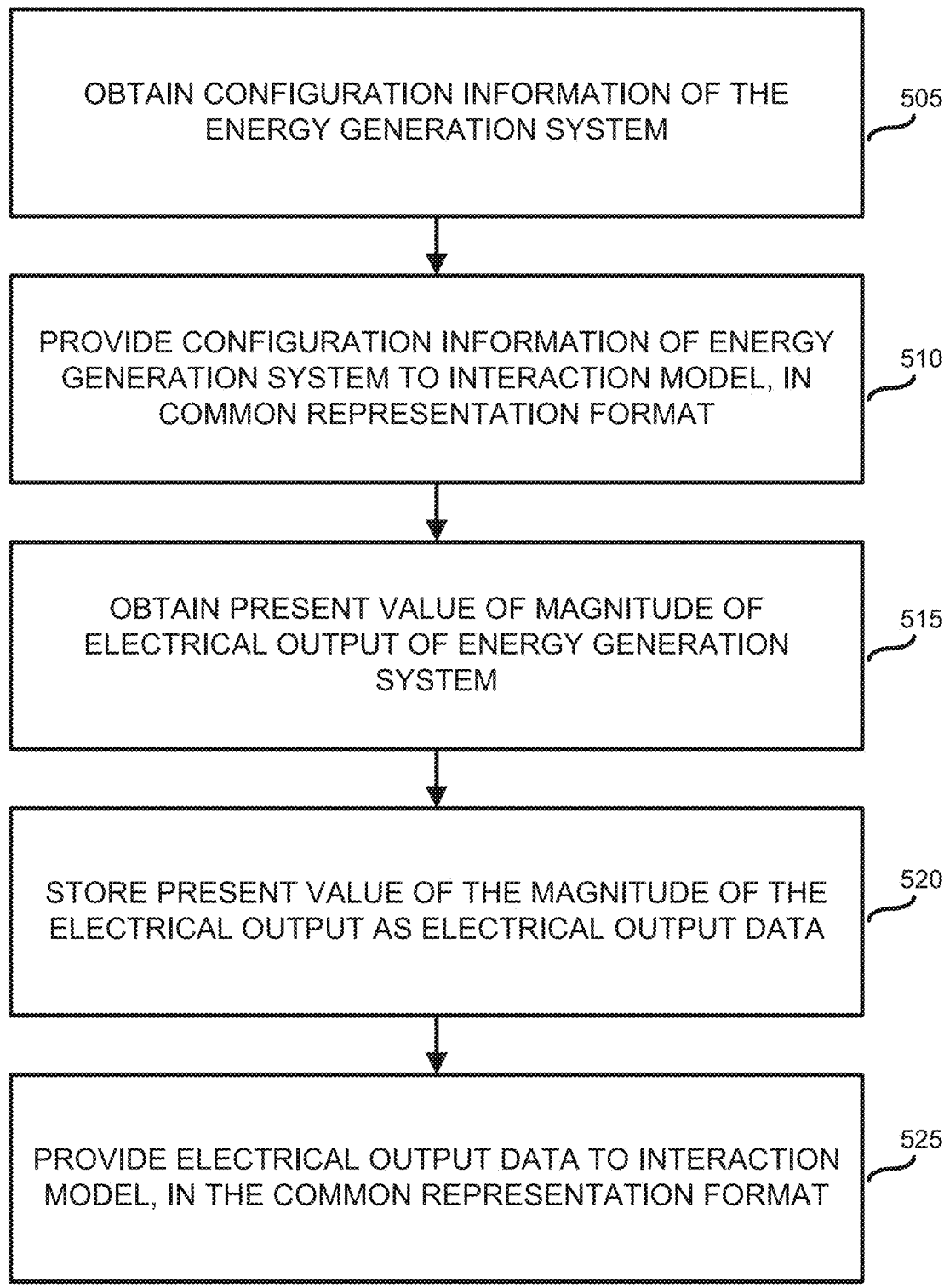

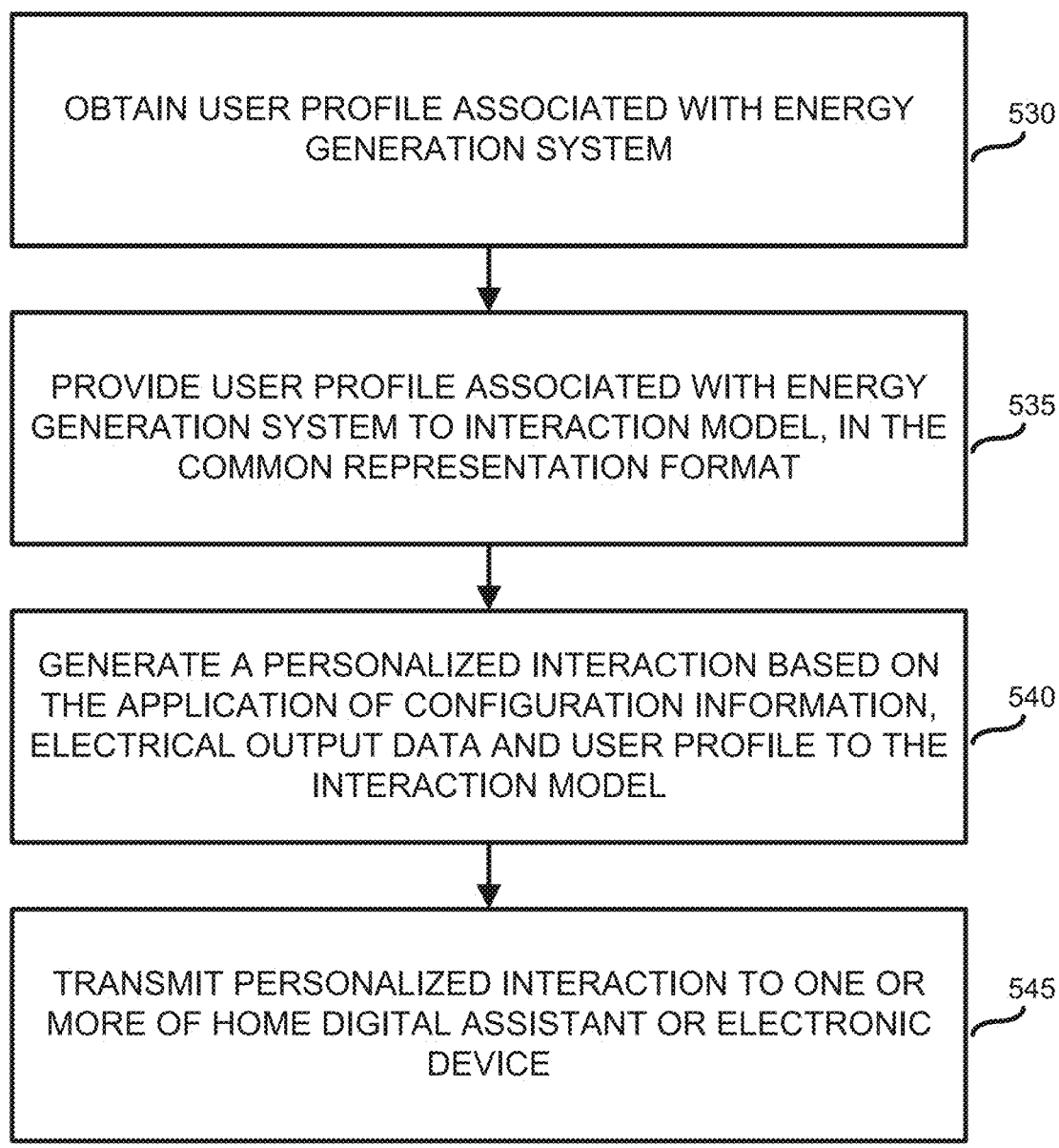

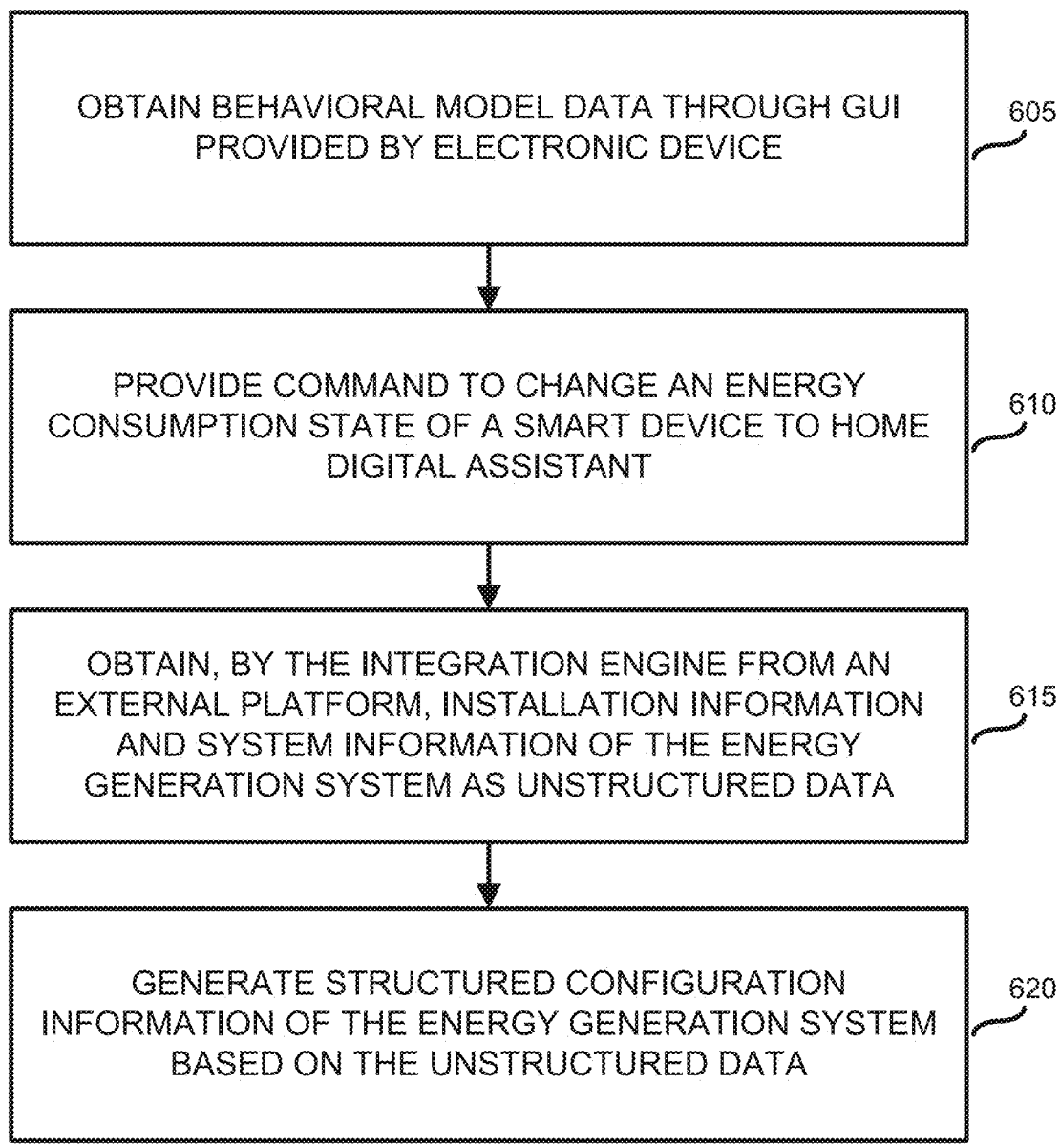

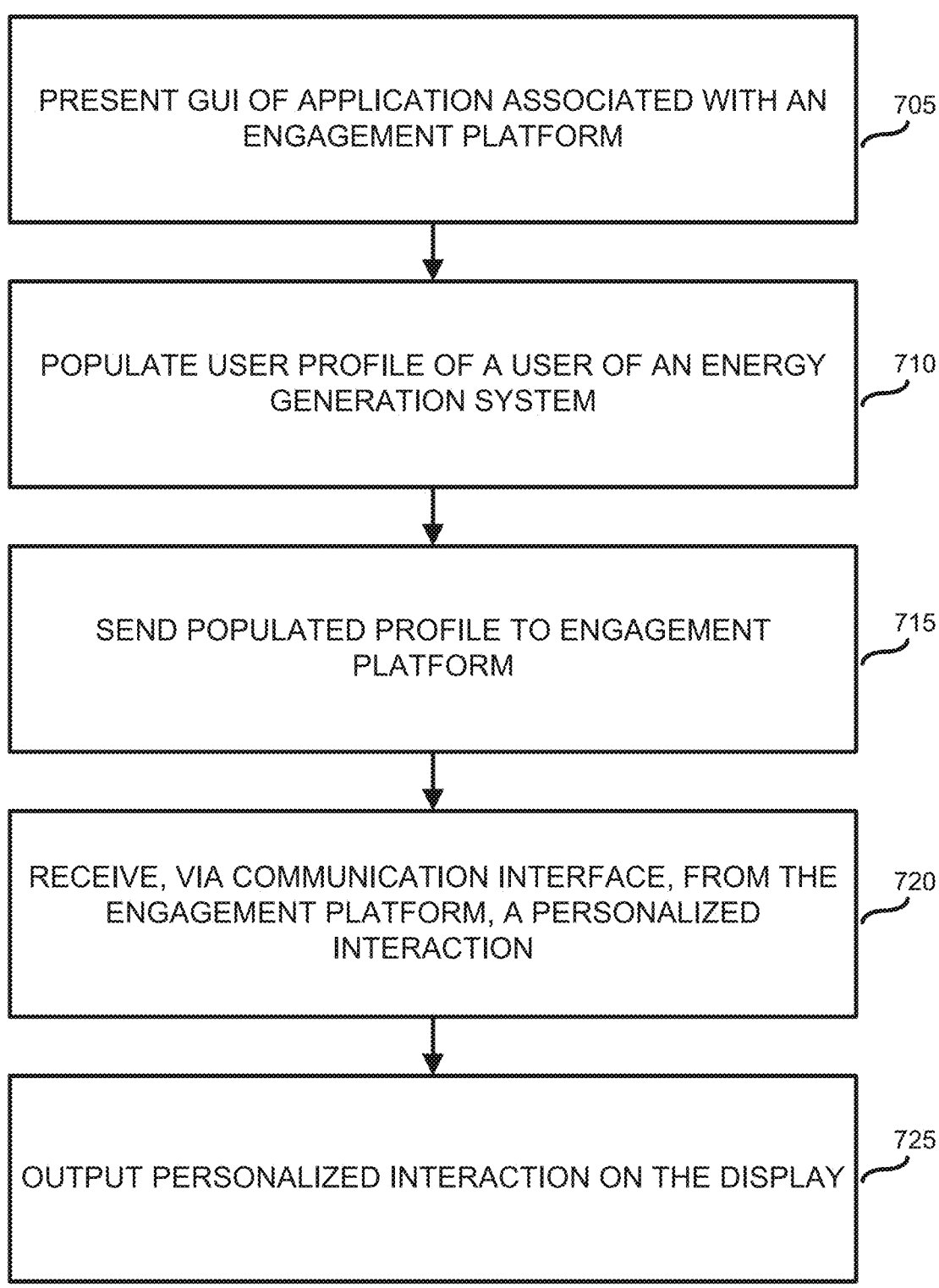

ENGAGEMENT AND INTEGRATION PLATFORM FOR RENEWABLE ENERGY MANAGEMENT SYSTEM AND METHOD THEREOF

CROSS-REFERENCE TO RELATED APPLICATION AND CLAIM OF PRIORITY

This application claims priority under 35 U.S.C. § 119(e) to U.S. Provisional Patent Application No. 62/718,217 filed Aug. 13, 2018. The above-identified provisional patent application is hereby incorporated by reference in its entirety.

TECHNICAL FIELD

This disclosure relates to systems for enhancing the efficiency and utilization of energy generation systems, such as home solar systems. More specifically, the present disclosure relates to an engagement and integration platform for a renewable energy management system and methods for implementing same.

BACKGROUND

The convergence of a variety of factors, including, without limitation, global warming, changes in public sentiment towards the environmental effects of non-renewable energy sources, and population growth, have heightened the demand for renewable energy sources and user-side efficiency to ease the load on the environment and utilities and other public electrical generation resources.

The approximately 120 million residential homes in the United States account for approximately forty (40%) percent of the country's total electricity consumption. Of these, only about 2 million homes have installed solar electricity generation systems, and over 95% of the homes in which solar energy systems could be installed do not have such systems. In view of the above facts, reducing residential homes' load on public energy resources is a logical place for realizing the gains in energy generation and energy conservation required to relieve the overall load on public production resources and promote sustainability.

While technology has, in recent years, significantly improved the energy efficiency of certain electrical apparatus (for example, the switch from incandescent to LED lightbulbs), these device-level gains in efficiency often do not translate into aggregate reductions in domestic energy usage. Instead, a Jevons paradox-like situation obtains, where increases in electrical efficiency produced by a new technology simply catalyze increases in demand. As an example, instead of causing people to use less energy overall, the aggregate effect of a more efficient lightbulb is often that people leave more lights on.

At the same time, while price adjustments and periodic interventions from electricity suppliers (for example, by including energy saving tips, such as turning off air conditioning systems during the midday, in utility statements) can effect limited improvements in efficiency, experience has shown that such interventions generally do not produce substantial or persistent improvements in home energy consumption. In this regard, the human response to excessive energy consumption habits presents parallels to other behaviors, such as smoking, where blunt correctives, such as warning labels and high product taxes, have proven significantly less effective in arresting the unwanted activity than more behaviorally nuanced techniques.

In view of the above, reducing a home's reliance on public sources of electricity has a significant behavioral component, as a home's energy consumption reflects, in large part, the behaviors of its users (for example, whether they care if lights are left on, or cooling systems run during the hottest parts of the day). The extent to which a monitoring and control system for a home energy generation system (for example, a home solar panel grid or windmill) can reduce the number of kilowatt/hours of electricity the home draws from a public utility depends, at least in part, on the extent to which the monitoring and control system operates in harmony with the residents of the home, and promotes energy efficient behaviors by its users. Put differently, to be effective in relieving the energy footprint of a home, a monitoring and management system needs to avoid catalyzing Jevons paradox-type behaviors (e.g., an increase in efficiency resulting in an increase in demand), or relying on blunt correctives (for example, turning off the lights or television at unwanted times) which are rejected or disabled by residents of the home. Or, in plain terms, a system for monitoring and managing a solar-powered home to meet energy footprint goals, must, to be fully effective, effectively interact with the human users of the home.

SUMMARY

This disclosure provides an engagement and integration platform for a renewable energy management system and methods for implementing same.

In a first embodiment, a system includes an engagement platform comprising a first processor and a first memory. The engagement platform further includes a database, and a communication interface. The system includes an energy generation system producing an electrical output, wherein the energy generation system includes a solar panel, an inverter, and an output sensor communicatively coupled to the engagement platform. The system includes a home digital assistant communicatively coupled to the engagement platform and an electronic device communicatively coupled to the engagement platform. The electronic device includes a second processor and a second memory containing instructions, which when executed by the second processor, cause the electronic device to provide a graphical user interface (GUI) for the system. In certain embodiments, the engagement platform is configured to obtain, via the communication interface, configuration information of the energy generation system and provide, to an interaction model implemented by the engagement platform, the configuration information of the energy generation system in a common representation format of the engagement platform. Additionally, the engagement platform is configured to obtain, via the communication interface, from the output sensor, a present value of a magnitude of the electrical output of the energy generation system, store the present value of the magnitude of the electrical output of the energy generation system in the first memory as electrical output data, and provide, to the interaction model, the electrical output data in the common representation format of the engagement platform. Still further, the engagement platform is configured to obtain, from the database, a user profile associated with the energy generation system and provide, to the interaction model, the user profile associated with the energy generation system in the common representation format of the engagement platform, generate a personalized interaction for a user associated with the energy generation system, the personalized interaction based on application of the configuration information of the energy generation system, the electrical output data, and the user profile to the interaction model, and transmit the personalized interaction, via the communication interface, to one or more of the home digital assistant or the electronic device.

In a second embodiment, an engagement platform includes a first processor, a first memory, a database, and a communication interface. The first memory contains instructions, which, when executed by the first processor, cause the engagement platform to obtain, via the communication interface, configuration information of an energy generation system communicatively coupled to the engagement platform, and provide, to an interaction model implemented by the engagement platform, the configuration information of the energy generation system in a common representation format of the engagement platform. The first memory further contains instructions, which when executed by the first processor, cause the engagement platform to obtain, via the communication interface, from an output sensor of the energy generation system, a present value of a magnitude of the electrical output of the energy generation system, store the present value of the magnitude of the electrical output of the energy generation system in the first memory as electrical output data, and provide, to the interaction model, the electrical output data in the common representation format of the engagement platform. Additionally, the first memory contains instructions, which when executed by the first processor, cause the engagement platform to obtain, from the database, a user profile associated with the energy generation system, provide, to the interaction model, the user profile associated with the energy generation system in the common representation format of the engagement platform, generate a personalized interaction for a user associated with the energy generation system, the personalized interaction based on application of the configuration information of the energy generation system, the electrical output data, and the user profile to the interaction model, and transmit the personalized interaction, via the communication interface, to one or more of a home digital assistant or an electronic device.

In a third embodiment, an electronic device includes a processor, a display, a communication interface, and a memory. The memory contains instructions, which when executed by the processor, cause the electronic device to present, on the display, a GUI of an application associated with an engagement platform, populate, through the GUI, a user profile of a user of an energy generation system, and send, via the communication interface, to the engagement platform, the populated user profile of the user of the energy generation system. The memory further contains instructions, which when executed by the processor, cause the electronic device to receive, via the communication interface, from the engagement platform, a personalized interaction, and output the personalized interaction on the display, wherein the personalized interaction is based on the application of an interaction model of the engagement platform to the user profile, electrical output data of the energy generation system, and configuration information of the energy generation system.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 5A and 5B illustrate operations of a method of an engagement platform according to various embodiments of this disclosure;

FIG. 6 illustrates additional operations of methods of operating an engagement platform according to various embodiments of this disclosure; and FIG. 7 illustrates operations of an example of a method 700 of operating an electronic device according to various embodiments of this disclosure.

DETAILED DESCRIPTION

FIGS. 1 through 7 discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged electronic device.

Figure 1:
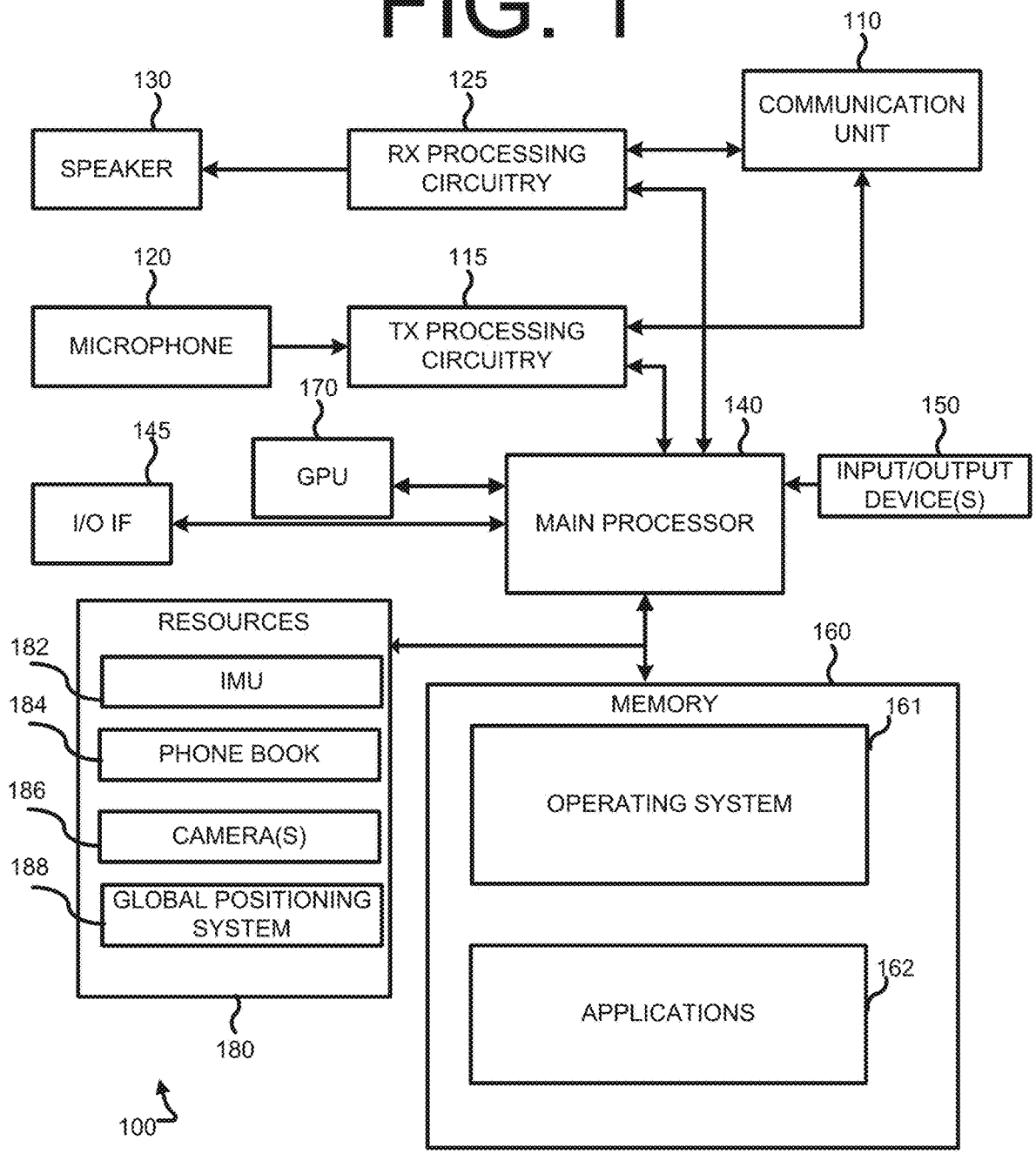
FIG. 1 illustrates an example of an electronic device for providing a GUI of an application for interacting with an engagement platform, and for receiving personalized interactions from an engagement platform, according to various embodiments of this disclosure.

FIG. 1 illustrates a non-limiting example of an electronic device for providing a GUI of an application for interacting with an engagement platform, and for receiving personalized interactions from an engagement platform, according to some embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 applications specifically configured to communicate with back-end processes of an engagement platform.

The communication unit (also referred to herein as a communication interface) 110 may receive an incoming RF signal, for example, a near field communication signal such as a BLUETOOTH® or WI-FI™ signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1. For example, according to certain embodiments, device 100 can further include a separate graphics processing unit (GPU) 170.

According to certain embodiments, device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a user's phone book 184, one or more cameras 186 of device 100, and a global positioning system 188.

Although FIG. 1 illustrates one example of a device 100 for providing a GUI of an application for interacting with an engagement platform, and for receiving personalized interactions from an engagement platform, various changes may be made to FIG. 1. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
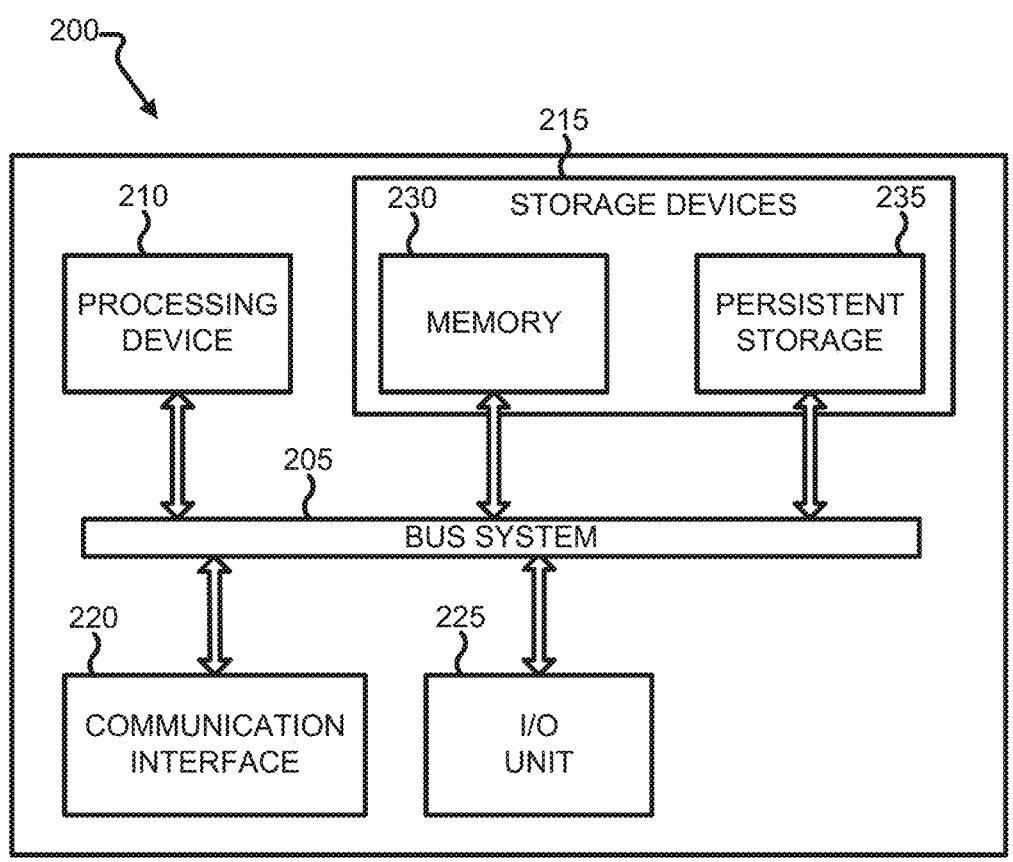
FIG. 2 illustrates an example of an electronic device 200 for implementing an engagement platform according to various embodiments of this disclosure.

FIG. 2 illustrates an example of an electronic device 200 for implementing an engagement platform according to various embodiments of this disclosure.

Referring to the non-limiting example of FIG. 2, the electronic device 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc. Further, persistent storage 235 may contain one or more databases of structured (for example, a .SQL database) or unstructured (for example, a columnar database) data.

According to various embodiments, communication interface 220 supports communications with other systems or devices. For example, in certain embodiments, communication interface 220 could include a network interface card or a wireless transceiver facilitating communications over the network 102. Communication interface 220 may support communications through any suitable physical or wireless communication link(s). According to various embodiments of this disclosure communication interface 220 supports communicative coupling (for example, via an internet connection) with one or more internet of things (IoT) devices, such as a home digital assistant (for example, an AMAZON ECHO or GOOGLE HOME device). Additionally, in certain embodiments, communication interface 220 supports one or more interaction channels between electronic device 200 and a mobile device (for example, device 100 in FIG. 1). For example, in various embodiments, communication interface 220 supports transmission and receipt of text messages between electronic device 200 and device 100, as well as internet-protocol based messages (for example, email), and in certain embodiments, may support a web based portal to electronic device 200.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

While FIG. 2 illustrates one example of an electronic device 200 suitable for implementing an engagement platform according to various embodiments, other architectures are possible and within the contemplated scope of this disclosure. For example, in some embodiments, an engagement platform can be across multiple devices, such as on a cloud computing platform.

Figure 3:
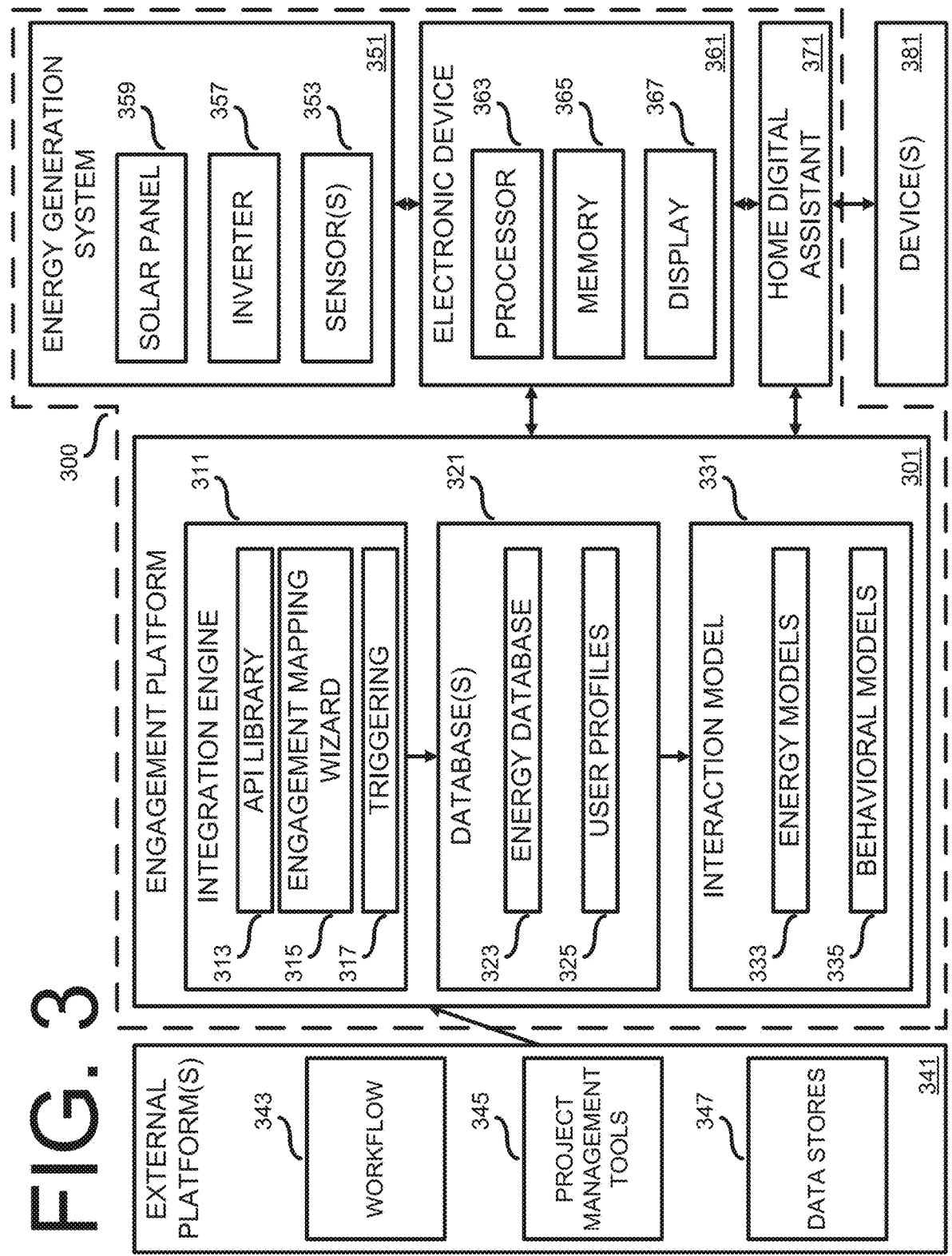
FIG. 3 illustrates an example of an engagement platform-based system for monitoring and managing an energy generation system, and for generating personalized interactions, according to various embodiments of this disclosure.

FIG. 3 illustrates an example of an engagement platform-based system 300 for monitoring and managing an energy generation system, and for generating personalized interactions for reducing a consuming entity's (for example, a home) net consumption of energy from a public source (such as a public electric utility).

Referring to the non-limiting example of FIG. 3, system 300 comprises an engagement platform 301, an energy generation system 351, an electronic device 361, and a home digital assistant 371. Additionally, and as described herein, engagement platform 301 is configured to communicate with one or more external platforms 341, as well as one or more energy consuming devices 381.

According to various embodiments, engagement platform 301 comprises an electronic device (for example, electronic device 200 in FIG. 2) comprising a processor (for example, processing device 210 in FIG. 2), a memory (for example, memory 230 in FIG. 2), and a communication interface (for example, communication interface 220 in FIG. 2). In some embodiments, engagement platform 301 is embodied on a single computing device (for example, a server). In certain embodiments, engagement platform 301 is embodied on multiple computing devices, or across a decentralized or shared computing architecture (for example, the cloud).

As shown in the illustrative example of FIG. 3, engagement platform 301 is communicatively coupled (for example, via the internet or over LTE, or another wireless network) to one or more external computing platforms 341, energy generation system 351, electronic device 361 and one or more energy consuming devices 381. According to various embodiments, engagement platform 311 may be directly communicatively coupled to one or more of the above-identified system components, or indirectly, through an intermediate component. For example, in some embodiments, engagement platform 301 is communicatively coupled to an energy consuming device (for example, a smart light bulb) through home digital assistant 371.

Referring to the non-limiting example of FIG. 3, in certain embodiments, engagement platform comprises an integration engine 311. According to various embodiments, integration engine 311 embodies control logic (either as hardware, software or a combination thereof) for, without limitation, assembling configuration information of energy generation system 351, information of a present electrical output (e.g., data showing how much electricity is currently being produced) of energy generation system 351, user information (for example, a user profile, as well as information regarding present energy usage by a home and other systems consuming electricity from energy generation system 351), and providing the assembled information in a common representation format which can be consumed by one or models of an interaction model 331 of the engagement platform to output a personalized interaction.

As noted elsewhere in this disclosure, implementing an energy generation system for a home in a way that substantially and persistently reduces the home's net consumption of electricity presents a multi-faceted technical challenge, whose dimensions include an optimization and control component (for example, adjusting energy consumption states of powered devices in a way that reconciles user requirements and temporal changes in the amount of electricity produced by energy generation system 351) and a behavioral component, wherein the control logic for the system produces interactions which avoid the pitfalls of spurring demand for electricity or going ignored. Addressing these dimensions of effecting a substantial reduction in net energy consumption can require real-time assembly and maintenance of a corpus of data drawn across a broad range of sources, which can be fed to an interaction model 331 to generate interactions which are personalized to the behaviors of users in a home powered by energy generation system 351. According to various embodiments, integration engine 311 handles the assembly and maintenance of such a corpus of data.

In various embodiments according to this disclosure, integration platform 311 comprises an application programming interface (API) library 313, which consists of one or more sets of API codes and commands which permit engagement platform 301 and, in particular integration engine 311 to communicate with software and processes (for example, project management software relating to a system build on external platform(s) 341 running outside of engagement platform 301). According to various embodiments, one or more APIs of API library 313 includes codes and commands to request that data be pushed or pulled (for example, from a monitoring application, such as the Enlighten application by Enphase Energy, Inc.) from various sources. Additionally, in some embodiments, one or more APIs of API library 313 specifies the format and frequency with which data is pulled from sources.

According to some embodiments, the efficacy of system 300, and in particular, the efficacy of personalized interactions provided by engagement platform 301, as measured in terms of user engagement with the platform, and energy relief on public sources (for example, electrical grids managed by public utilities) by system 300 is enhanced by onboarding data from a wide range of external platforms 341. Accordingly, integration engine 311, is in certain embodiments, configured to obtain configuration and installation information from the workflow data 343 from a plurality of external platforms, for example, the externally-facing systems of each installer or manufacturer of a component incorporated in energy generation system 351. Further, in certain embodiments, integration engine 311 is configured to integrate with the externally facing platforms of subcomponent manufacturers and of sources of components not specifically enumerated as parts of energy generation system, but as necessary accessories thereto (for example, suppliers of insulation, wiring, and installation hardware). Similarly, integration engine 311 is, in certain embodiments, configured to interface with project management tools 345 across a plurality of external platform(s) 341, including without limitation, the wide variety of different, and unique project management tools (for example, ASANA, JIRA and LIQUIDPLANNER) utilized by each of the stakeholders in the implementation of an energy generation system. Additionally, in certain embodiments, to obtain data to provide to, and develop, resonant interaction models (for example, interaction model 331) integration engine 311 is configured to interface with, and obtain interaction-related data from a wide range of miscellaneous data stores 347, including, without limitation, solar irradiance databases, solar installation databases, databases of utility rates, governmental databases (for example, databases of permitting documents for the installation of energy generation systems, databases of tax credits for solar system installations), and databases of neighborhood information (for example, databases of homeowners' association restrictions on solar system installations).

As the number of data sources on external platform(s) 341 from which integration engine 311 grows, so too, do the technical challenges associated with obtaining data from an expanded range of data sources. Examples of the technical challenges associated with scaling the sources with which integration engine 311 interfaces with include, without limitation, avoiding unnecessary computational and network load associated with implementing API calls when source data on one or more external platforms 341 has not changed. In embodiments wherein one or more computing functions of engagement platform are performed in a cloud computing environment (for example, with a cloud computing service such as AMAZON WEB SERVICES), the technical challenges of superfluous API calls are compounded by the monetary expense associated with having the cloud computing service perform an unnecessary computational task. Accordingly, in some embodiments, the technical challenges associated with the computational and network load associated with collecting data from a wide range of external platforms 341 are addressed by one or more components of integration engine 311 (for example, API library 313) provisioning one or more external platforms of external platform(s) 341 with conditional control logic for triggering transmission of data to engagement platform 301. Thus, in certain embodiments, as an alternative to integration engine 311 polling external platform(s) 341 for new data, and courting the risk of there being no new data, transmission of data from external platform(s) 341 to engagement platform 301 is triggered by logic on external platform(s) 341 provided by integration engine 311. In certain embodiments, the conditional control logic for transmitting data from one or more of external platform(s) 341 to engagement platform 301 is implemented through webhooks, or simple notification service (SNS) events.

As shown in the illustrative example of FIG. 3, integration engine 311 further comprises an engagement mapping wizard 315. In certain embodiments, the overall effectiveness of system 300 in catalyzing a net reduction in a home's consumption of electricity from public generation sources has been shown to be improved by providing personalized interactions to a user at the outset of the implementation of an energy generation system (for example, during the permitting and design phase), rather than at completion of the installation. In this way, users can interact with engagement platform 301 (for example, through an application providing a GUI for engagement platform 310, or another interaction channel supported by engagement platform 301) and begin cultivating both a familiarity with engagement platform 301 as well as habits of engagement with engagement platform 301, which reduce the probability that personalized interactions provided by engagement platform 301 are actionable and lead to substantial and persistent improvements in reducing a home's load on a public energy source. For many users, by interacting with engagement platform 301 at an early stage of the journey of implementing a home solar energy generation system (sometimes referred to as the "solar journey"), users are more likely to have sustained, positive engagement with energy monitoring applications supported by engagement platform 301. In some embodiments, through interactions at early stages of the solar journey, applications linked to an engagement platform are regarded by users as more than just an "ordinary app on their phone," and personalized interactions provided by engagement platform 301, whether as suggestions for actions to be taken by a user (for example, closing windows) or control inputs to power consuming devices 381, are less likely to be ignored or rejected (for example, by turning on a device which had been turned off by through a personalized interaction.) Simply put, experience has shown that increased user engagement with engagement platform 301 begets improvements in the efficiency with which generated electricity is used, and user interaction at early stages of the solar journey fosters user engagement with engagement platform 301.

According to various embodiments, engagement mapping wizard 313 operates to map data from early stages of the solar journey into personalized interactions. As a non-limiting example, an API of API library 313 may be configured to pull unstructured workflow data provided by workflow management software (for example, TRACKVIA) used by an installer of an energy generation system, and map the unstructured data to interactions (for example, a GUI advising on the current status of the installation of the energy system and next steps) to engage the user. Additionally, according to various embodiments, engagement mapping wizard 315 supports early-stage personalized interactions to obtain information regarding a user which can be used to populate fields of a user profile which can be applied to one or more behavioral models. In some embodiments, these early-stage (for example, before installation of an energy generation system is completed) interactions comprise presentation of a graphical user interface (GUI) which asks the user questions about the user's energy generation or energy conservation targets (for example, whether their goal is to become fully energy independent, or to limit their consumption of electricity from public sources to a threshold quantity). Additionally, in certain embodiments, engagement mapping wizard 315 is configured to generate structured configuration information (information regarding the make, model, number of cells, date of installation) from unstructured data pulled from computing platforms (for example, external platforms 341 in FIG. 3) external to system 300. In some embodiments, generating structured configuration data comprises mapping disparate data pulled (for example, using APIs of API library 313) to fields used by interaction model 331, and then automating the continued collection of the data.

Referring to the non-limiting example of FIG. 3, according to various embodiments, integration engine 311 further comprises a triggering function 317. According to various embodiments, triggering function 317 comprises control logic (embodied as hardware, software, or a combination thereof) for generating and transmitting personalized interactions to one or more of energy generation system 351, electronic device 361, home digital assistant 371 or energy consuming device(s) 381. According to various embodiments, triggering function 317 comprises listeners to detect changes or updates in one or more sources of data from which integration platform 311 obtains data through APIs of API library 313. Additionally, in some embodiments, triggering functionality 317 comprises conditional logic for triggering the initiation and transmission of interactions. As a non-limiting example, if an API of API library pulls workflow data 343 from an external platform which contains a data value which is different from previously pulled data (for example, data showing a value in a new data field or an updated value in an existing data field), conditional logic in triggering functionality 317 may determine whether to send a personalized interaction. As a further non-limiting example, triggering functionality 317 may determine that a predefined step in the installation workflow (for example, installation of an inverter) has occurred, and provide, through one or more interaction channels (for example, a GUI of an application, such as the Bodhi app by 17 TeraWatts, on electronic device 361) supported by engagement platform 301 a notification advising the user of this step in their solar journey. According to various embodiments, the content of the interactions triggered by triggering functionality 317 are defined, at least in part, by interaction model 331.

Referring to the non-limiting example of FIG. 3, in various embodiments, engagement platform 301 comprises one or more databases 321. According to some embodiments, databases 321 are maintained in a hard drive or other persistent storage device (for example, persistent storage 235 in FIG. 2) on the computing platform implementing engagement platform 301. In various embodiments, database(s) 321 are maintained separately, such as on a cloud server.

As shown in the illustrative example of FIG. 3, database(s) 321 comprises an energy database 323. According to various embodiments, energy database 323 comprises a time series database (e.g., a database comprising data structured as time:value pairs) of time-keyed energy consumption and energy production data for a plurality of users (for example, consumption and production data for a first house, which uses electricity from energy generation system 351, as well as consumption and production data for one or more other houses, which use electricity from other energy generation systems). According to various embodiments, energy production data in energy database 323 is obtained from one or more output sensors 353 of energy generation system 351, or via an API of a monitoring and measurement application of energy generation system 351. In certain embodiments according to this disclosure, energy consumption data is obtained via an API configured to pull consumption data from one or more of an external computing platform 341 (for example, a data store of a utility), or from networked devices 381 (for example, an IoT controller) in the home.

As shown in the illustrative example of FIG. 3, database(s) 321 further comprise one or more databases of user profiles. In certain embodiments, user profile database 325 comprises a relational database of user profile data for a plurality of users, including a user associated with energy generation system 351, as well as one or more users associated with energy generation systems other than energy generation system 351. According to various embodiments, user profile database 325 is constructed based on a schema which models, without limitation, the following pieces of information pertaining to one or more energy generation systems (including, for example, energy generation system 351):

Installation information associated with one or more user's energy generation systems: for example, the identity of the installer each component of energy generation system, the roles of each installer, dates of installations, pointers to image data collected during installation, identifiers of the project managers and project management tools used during installation, key dates (for example, expiration dates for permits), and pointers to files for installation documents (for example, permits, installation notes, etc.)

Configuration/system information associated with one or more user's energy generation systems: for example, an identifier of an electric utility serving the user's home, the identity of the specific components of the energy generation system, the geographic location of the user's home, and the time zone of the energy generation system.

Behavioral model information: for example, scores mapping a user associated with an energy generation system to a representation within a behavioral model (for example, a score indicating that the user associated with energy generation system maps primarily to a particular type (for example, an "achiever" Bartle player type) within a behavioral model.

Social information: for example, experience has shown that many owners of home solar systems and other energy generation systems seek out other energy system owners, and that user's level engagement with an energy management platform (for example, engagement platform 301) is enhanced when the platform offers a social component (for example, a way of identifying other solar system owners in one's neighborhood). Consistent with this, user profile database 325 may include one or more of the following types of social data: a user's posted status, pointers to messages with other energy generation system owners, and data showing referrals (for example, of a local installer) by users.

Referring to the non-limiting example of FIG. 3, according to various embodiments, integration platform 301 further comprises one or more interaction models 331. In some embodiments according to this disclosure, conditional logic implemented by triggering functionality 317 controls the triggering of interactions by engagement platform 301 with one or more of a user of energy generation system 351, energy generation system 351 itself, or one or more device (s) 381 powered by energy generation system 351. However, in certain embodiments, the mode (for example, which interaction channel is used) and manner of the triggered interaction are determined based on the application of one or more of data in energy database 323 and user profile database 325 to one or more models in interaction model 331.

As shown in the illustrative example of FIG. 3, according to some embodiments, interaction model 331 comprises one or more of an energy model 333 and a behavioral model 335.

According to certain embodiments, energy model 333 comprises one or more algorithms which process energy data from energy database 333 (for example, present or historical energy production or consumption data) to determine a candidate set of interactions, which can be provided over one or more interaction channels. In some embodiments, interaction within a candidate set of interactions include presentation of a message (for example, as a text message or as a GUI presented via an application connected to engagement platform 301) identifying a user's current energy production status relative to a goal, or a control input to a powered device 381 changing its energy consumption state (for example, turning down a thermostat, or turning on a charger for an electrical vehicle at a time of high energy production).

In some embodiments according to this disclosure, behavioral models 335 one or more algorithms which implement behavioral frameworks to select or tailor interactions from a candidate set of interactions specifically to a user of energy generation system 351 based on data about the user in user profile 325. According to some embodiments, behavioral model 335 comprises behavioral models implementing a sense-of-place ("SOP") behavioral framework. As used in this disclosure, SOP encompasses behavioral frameworks which incorporate the collection of meanings, beliefs, symbols, values and feelings that a user has with a particular location. In some embodiments, SOP-based behavioral frameworks seek to facilitate the connection a user has to a space, and foster the user's stewardship of space. In this regard, interactions from engagement platform 301, which have been tailored through application of user profile data to a behavioral model 335 implementing an SOP-based behavioral framework, can be especially effective reducing a home's energy consumption to what energy generation system 351 can presently supply.

As a purely illustrative example, consider a home powered, at least in part, by energy generation system 351 on a hot summer's day, in which an air conditioning unit powered by energy generation system 351 is not able to cool a house which is being heated by the midday sun. Based on the application of energy data in energy database 323, energy model 333 determines that closing the blinds of the house to reduce the solar uptake is the best candidate intervention for bringing the current heating rate of the home to within what energy generation system 351 can provide for the home's air conditioning system. By applying user profile data to a behavioral model 335 utilizing an SOP framework, the intervention can be personalized to resonate with the user and effect the desired intervention. For example, certain interventions pushed out by engagement platform 301, such as sending a command to automatically close IoT blinds in the house, or announcing on home digital assistant 371 "It's hot today. Please close the blinds to ease the load on the AC system" may be rejected as being intrusive (e.g., the user was looking out the window and did not want the blinds to be automatically closed), or as trivial or nagging (for example, a user's response to an announcement about the outside temperature may be dismissive, and of the form "It's always hot in Texas, there's nothing I can do about it.") By contrast, an interaction which has been personalized through application of an SOP-based behavioral model may be more effective. For example, a personalized intervention comprising a message of the form, "Go touch your window. Would you have guessed it is 100 degrees out right now? Close the blinds and feel the difference in temperature. Did you know that closing the blinds on a sunny day can reduce electricity consumption by 10%" will, for certain users, be more resonant and effective in closing the blinds of the house and bringing energy consumption to within the present capacity of energy generation system 351, than a blunt corrective, such as automatically closing the blinds, or announcing that the blinds should be closed.

According to some embodiments, in addition to, or instead of, SOP-framework based models, behavioral models 335 comprise behavioral models based on other behavioral frameworks, such as Bartle Player Types, the Fogg Behavioral Model, or behavioral frameworks integrating a user's behaviors into a social framework. For example, a behavioral model 335 utilizing a Bartle Player Type maps data in user profile database 325 to personalize an interaction to appeal to a specific user's motivations to act. Specifically, in certain embodiments, users may be mapped, based on data in user profile database 325 as belonging to one or more player types, each type having different propensities and motivations. For example, users belonging to one player type may primarily be motivated by a desire to achieve and meet goals. Returning to the previous example of personalizing an interaction from engagement platform 301 to resonate with a user, for a user mapping to an achievement-motivated player type, the personalized interaction from engagement platform 301 may be of the general form "You've saved $32 on electricity this month, and you're 12% away from your monthly goal of halving how much energy you use from the utility company. Would you like me to close the IoT blinds?" Similarly, for a user mapping to a player type motivated by competition, the interaction may be personalized to resonate for such a user, and be of the general form, "The Johnsons are beating us in the race to getting off the grid. Shall I close the IoT blinds to help us pull ahead?"

According to various embodiments, system 300 comprises energy generation system 351. Referring to the illustrative example of FIG. 3, in some embodiments, energy generation system 351 is a home solar energy system comprising one or more solar panel(s) 359, an inverter 357, and one or more output sensor(s) 353. According to various embodiments, solar panel(s) 359 are photovoltaic panels which are mounted on a user's property (for example, on the roof of a home) and which convert solar irradiance to a direct current ("DC") of electricity provided to inverter 357. In certain embodiments according to this disclosure, inverter 357 comprises an apparatus for converting electricity provided as a DC to an alternating current (AC), such as provided by most home electrical outlets. Further, as shown in the illustrative example of FIG. 3, energy generation system 351 further comprises sensor(s) 353. According to some embodiments, sensors 353 include sensors configured to output measurements of the energy production and power produced by energy generation system 351. In certain embodiments, sensors 353 further comprise sensors configured to measure the energy and power consumed by devices 381 which are powered by energy generation system. In some embodiments, sensors 353 are communicatively coupled to other entities within system 300 (for example, electronic device 361 and energy generation system 351) via the internet, and support applications by which production and consumption data is remotely accessible (for example, through a monitoring app running on electronic device 361).

Referring to the non-limiting example of FIG. 3, according to certain embodiments, system 300 comprises one or more electronic devices 361 (for example, device 100 in FIG. 1). As shown in the illustrative example of FIG. 3, electronic device 361 comprises, without limitation, a processor 363, a memory 365 and a display 367. According to various embodiments, processor 363 comprises a low-power processor suitable for a portable, networked device, such as a smartphone or tablet. Examples of processors suitable for use as processor 363 include, without limitation, the A11 processor by APPLE CORPORATION and the EXYNOS series of processors by SAMSUNG CORPORATION.

According to various embodiments, electronic device 361 further comprises one or more memories 365. In some embodiments, memory 365 is a non-transitory memory storing instructions (for example, in the form of an application running on electronic device 361, or a client application for a service provided on a physically separate computing platform) for implementing one or more GUIs (for example, the GUIs described with reference to FIGS. 4A through 4F of this disclosure) on display 367 through which a user associated with energy generation system 351 can interact with engagement platform 301 and receive personalized interactions from engagement platform 301. According to various embodiments, display 367 is a touchscreen display configured to receive application inputs through touches and gestures upon the surface of display 367.

Referring to the non-limiting example of FIG. 3, system 300 comprises one or more home digital assistants 371. According to various embodiments, home digital assistant 371 comprises a networked apparatus (for example, an AMAZON ECHO®) which is communicatively coupled to engagement platform 301 (either directly, such as over the internet, indirectly, through another device, such as electronic device 361), and which operates as a hub (for example, an IoT hub) or controller for one or more networked devices 381 operating, at least in part, from power provided by energy generation system 351. Further, in certain embodiments, home digital assistant 371 is configured to receive personalized interactions from engagement platform 301, including, without limitation, personalized interactions provided as statements formulated in part by the application of data in database 321 to one or more models of interaction model 331. In some embodiments, home digital assistant 371 is configured to receive personalized interactions from engagement platform 301 provided as commands to change an energy consumption state (for example, being on, being off, a thermostat setting, a switch to or from a "charge" or "sleep" mode, etc.).

Referring to the non-limiting example of FIG. 3, in certain embodiments, home digital assistant 371 is communicatively connected to one or more device(s) 381, wherein home digital assistant 371 (or, in certain embodiments, another actor communicatively coupled to engagement platform 301) is able to change the energy consumption state of device(s) 381. Examples of devices 381 include, without limitation, controllers for other home systems (for example, a network connected thermostat or light switch), "smart" appliances (for example, smart light bulbs), and home energy storage systems and controllers for same.

FIGS. 4A through 4F illustrate examples of GUIs provided on an electronic device (for example, electronic device 361 in FIG. 3) according to certain embodiments of this disclosure.

Figure 4A:
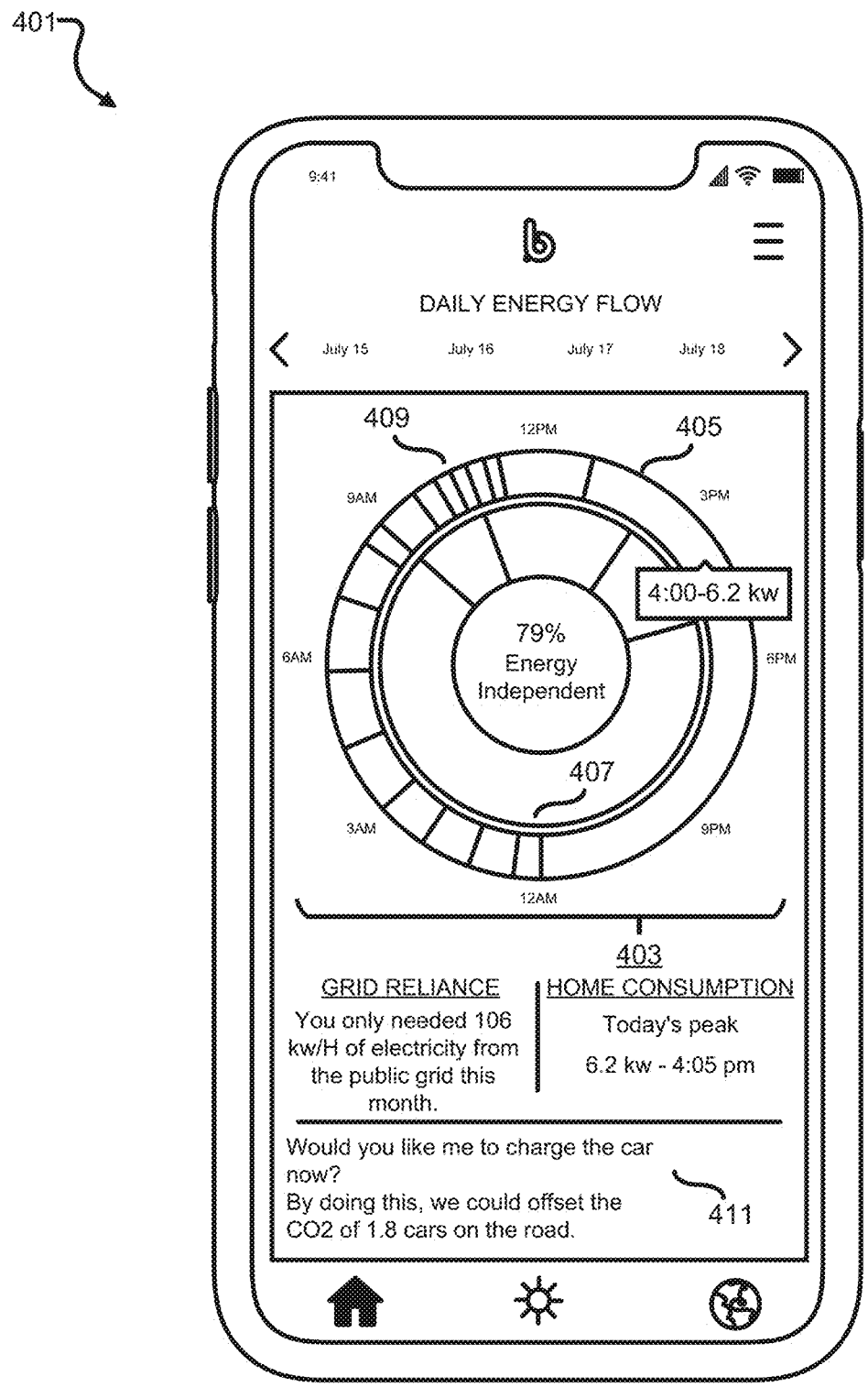
FIGS. 4A through 4F illustrate examples of GUIs provided on an electronic device according to certain embodiments of this disclosure.

Referring to the non-limiting example of FIG. 4A, an example of a graphical user interface (GUI) 401 provided by an application supported by an engagement platform (for example, engagement platform 301 in FIG. 3) according to certain embodiments of this disclosure, is illustrated.

According to some embodiments, GUI 401 provides a monitoring and performance visualization 403. In some embodiments, monitoring and performance visualization provides, based on a store of energy data maintained locally at the electronic device, or provided via a network from an outside source (for example, energy database 323 in FIG. 3), a visualization of the relative volume of electricity production by the associated energy generation system (for example energy generation system 351 in FIG. 3), and the energy consumption by devices powered by the associated energy generation system. In this illustrative example, energy consumption is shown on an outer ring 405 and energy production is shown on an inter ring 407 with radial hash marks (for example, radial hash mark 409) indicating the time when a predetermined increment of energy (for example, 10 kw/H) has been consumed or produced. According to certain embodiments, GUI 401 is configured to provide and implement a personalized interaction 411.

As discussed elsewhere in this disclosure, improvements in the quality engagement between a user and control and monitoring processes of both an energy generation system and a smart home have been observed to improve the overall efficiency of the home as a consumer and producer of electricity beyond what can be achieved by simply providing users with energy consumption/energy cost data, or programmatically controlling the energy consumption state of devices within the home. FIG. 4A illustrates an example of a personalized interaction 411, which can provide improved engagement between a user and system. As shown in the non-limiting example, of FIG. 4A, personalized interaction 411 comprises a statement about the current energy consumption state of the home, which, through the application of user data (for example, data in user profile database 325 in FIG. 3) has been tailored to a user's traits within a behavioral framework. Further, according to certain embodiments, personalized interaction 411 comprises an option (again, presented according to the application of user profile data to an interaction model) for implementing a change in the energy consumption state of a smart device (in this case, a charger for an electric vehicle) operating under the power of the energy generation system.

Figure 4B:
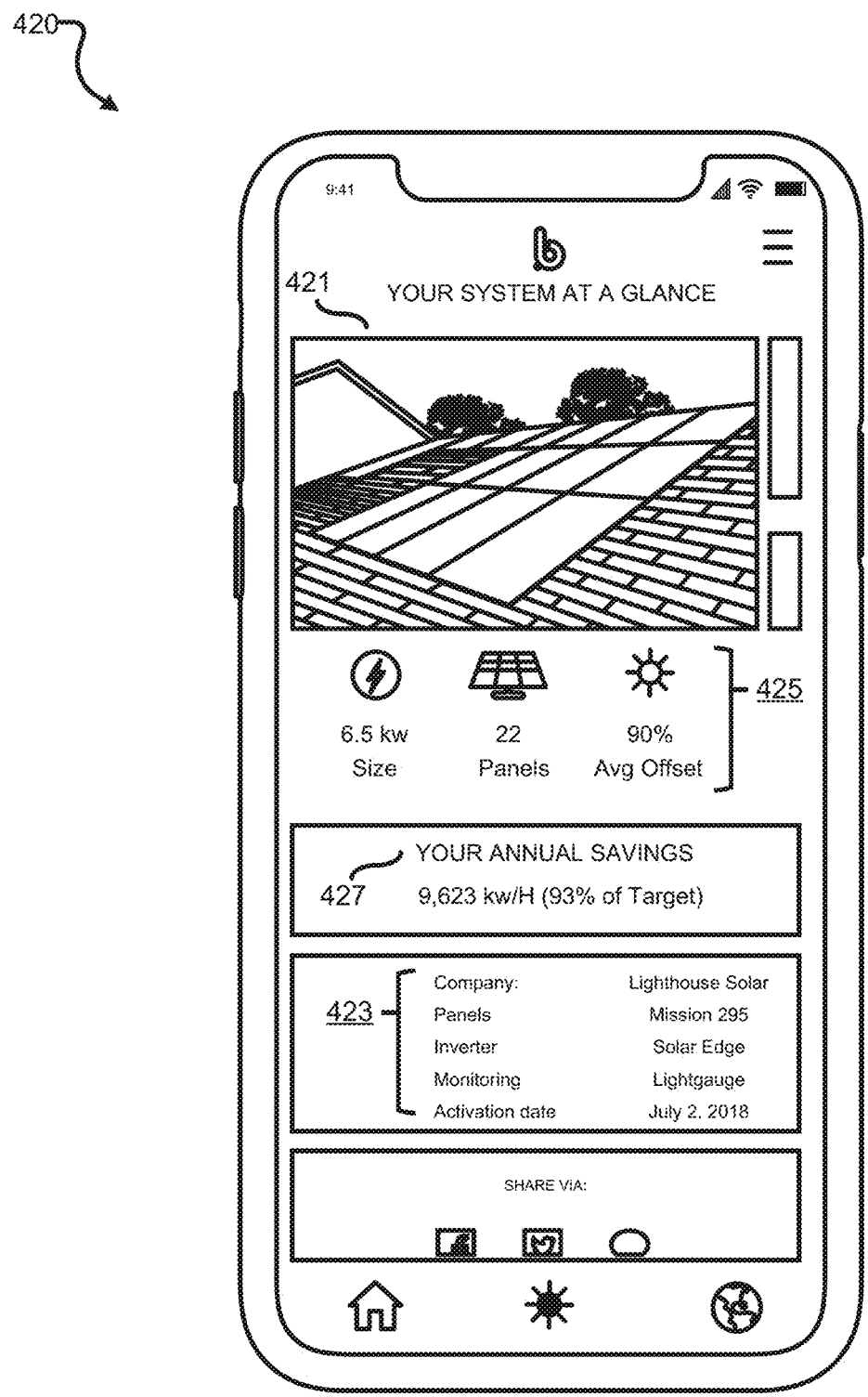

Referring to the illustrative example of FIG. 4B, an example of a GUI 420 provided on an electronic device (for example, device 100 in FIG. 1) communicatively coupled to an engagement platform, according to certain embodiments of this disclosure is provided.

According to various embodiments, GUI 420 is configured to provide a visual overview of a user's energy generation system (for example, energy generation system 351 in FIG. 3). As shown in the illustrative example of FIG. 4B, GUI 420 incorporates information from multiple stages of a user and system's solar journey, including information collected by an integration engine (for example, integration engine 311) from external computing platforms during the construction and initial setup of the energy generation system. For example, GUI 420 includes one or more installer photographs 421, as well as information 423 comprising data pulled from installers and third party service providers, such as the installer (in this case, "Lighthouse Solar") of the energy generation system. According to various embodiments, GUI 420 further comprises one or more items of data 425 reflecting a measure of the current or recent efficiency performance of a home and the energy generation system. For example, in this example, item of data 425 indicates that, on average, solar energy offsets, or addresses, 90% of the electricity requirements of a user's home. According to various embodiments, GUI 420 includes one or more items of data 427 based on a user-selected energy generation or energy conservation target. In this non-limiting example, item of data 427 comprises a measure of the user's energy consumption relative to a target or threshold condition kept in a user profile (for example, a user profile maintained in user profile database 325 in FIG. 3).

Figure 4C:
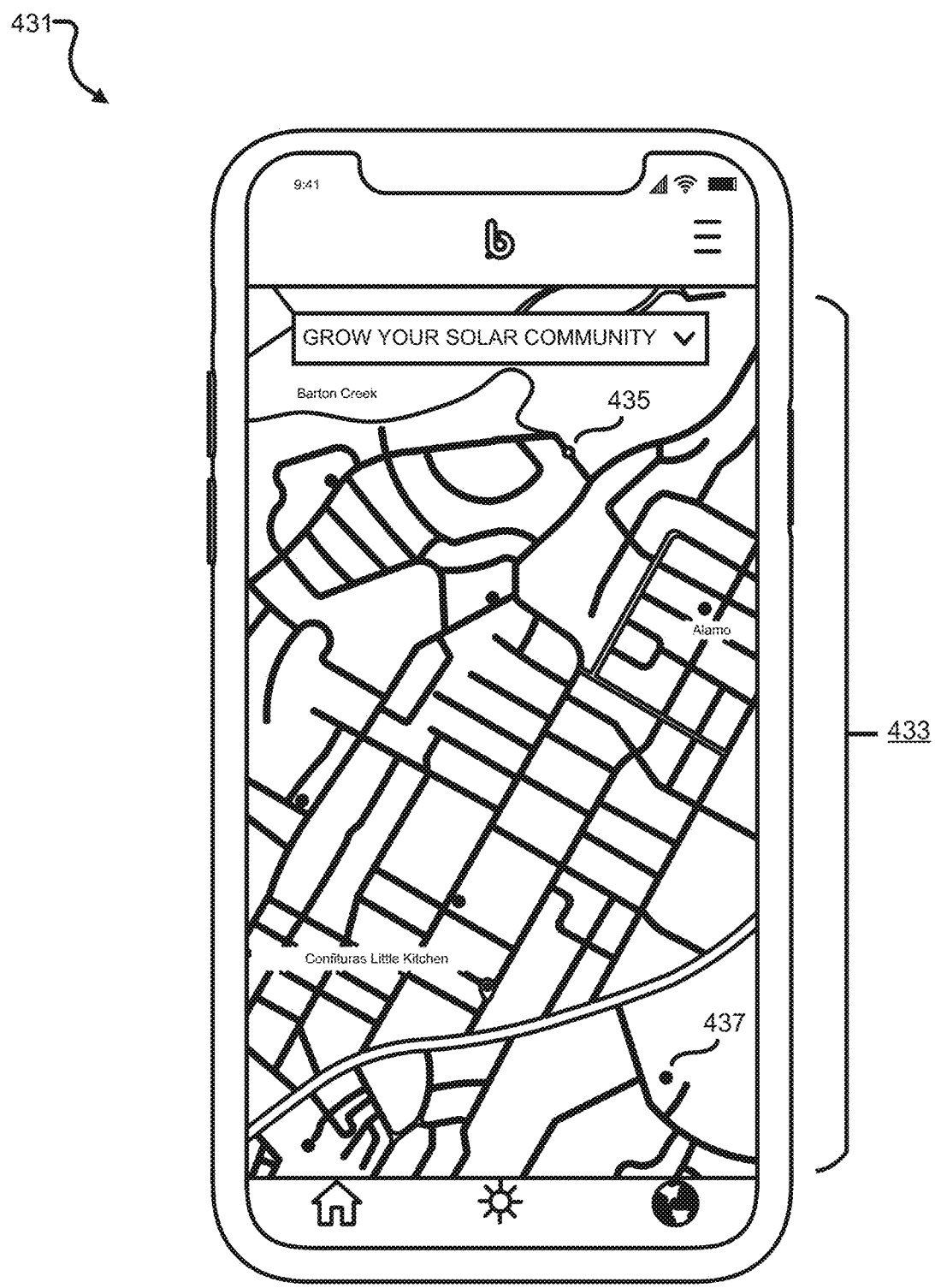

FIG. 4C illustrates an example of a GUI 431 provides on an electronic device communicatively coupled to an engagement platform, according to various embodiments of this disclosure.

As noted elsewhere in this disclosure, the quantity and quality of users' engagement with control logic (including control logic implemented at an engagement platform) for an energy generation system and smart home can, in some embodiments, be improved by implementing functionality which provides a social component to user's engagement with an energy generation system. GUI 431 illustrates a non-limiting example how an engagement platform and electronic device can provide a social component. Referring to the non-limiting example of FIG. 4C, GUI 431 comprises a local map 433, showing the location of a user's home 435. Using user profile data (for example, data in user profile database 325 in FIG. 3), the locations of nearby homes (for example, home 437) with solar energy systems are shown on the map. Depending on other users' privacy settings, and for example, behavioral framework information in the user of GUI 431's user profile, GUI may provide other functionality, such as a messaging functionality through which the user can, through GUI 431 "connect" with other nearby solar users, or in some embodiments, compete with other nearby solar users in trying to achieve energy efficiency or production targets.

Figure 4D:
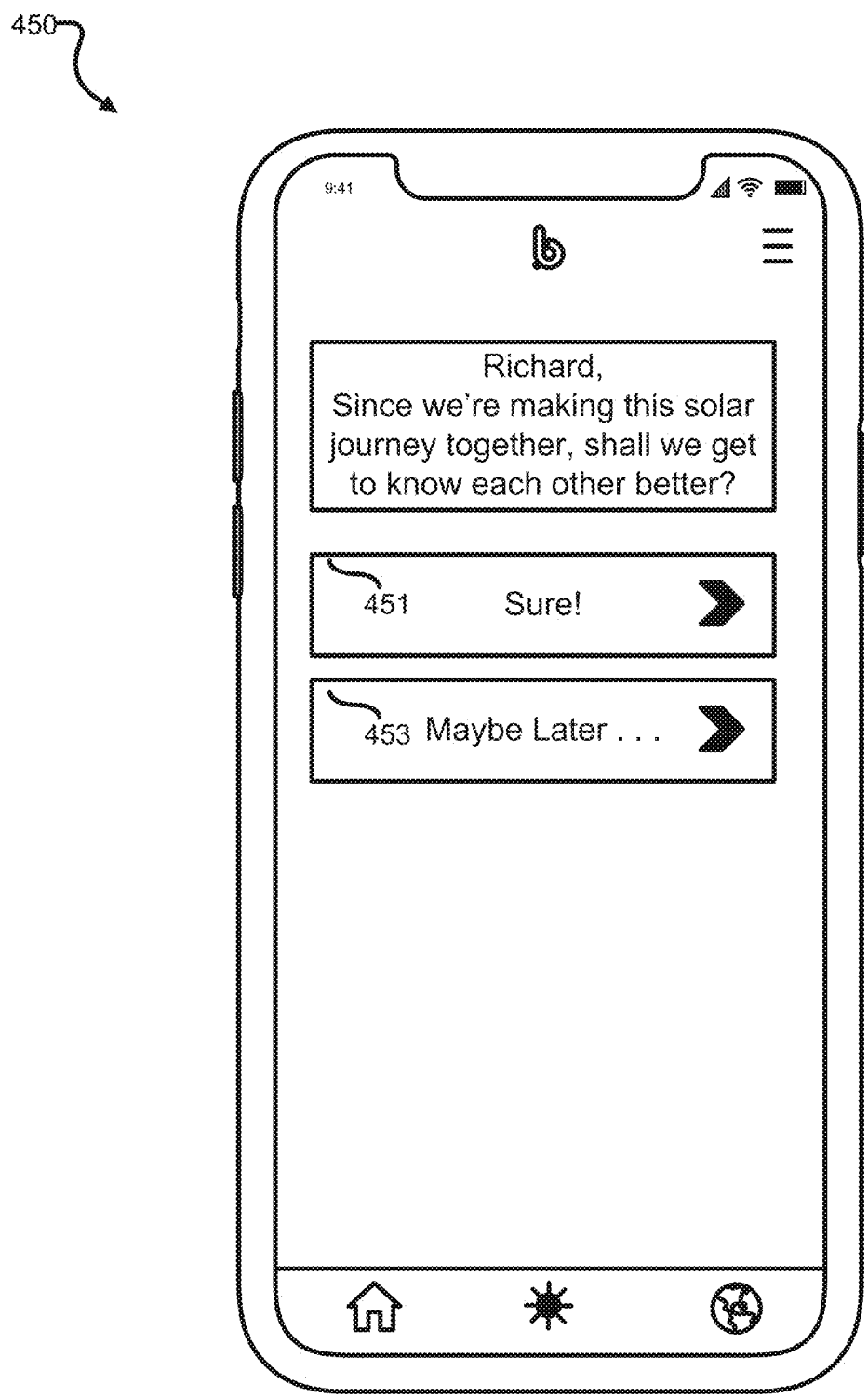
Figure 4E:
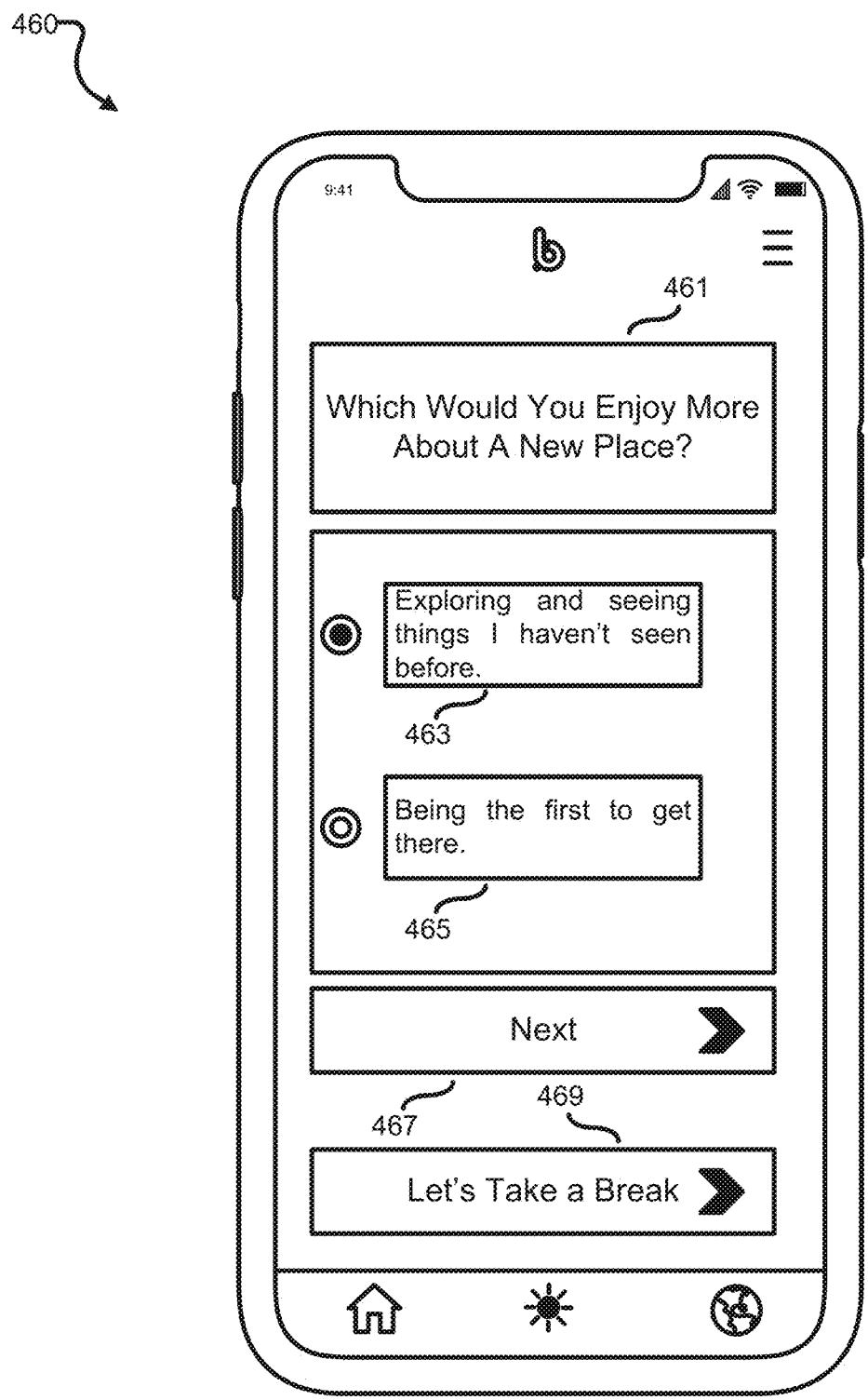
Figure 4F:
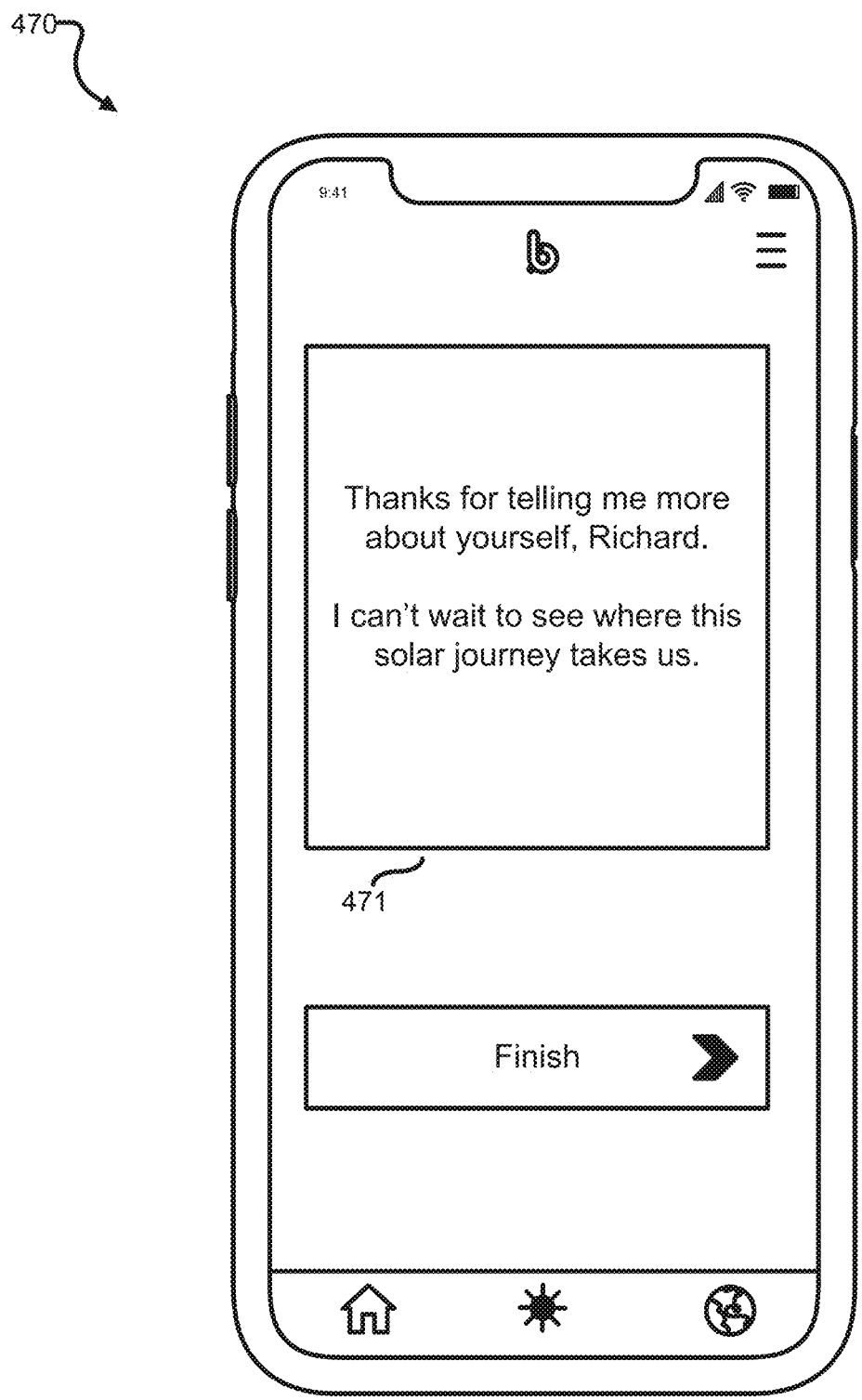

FIGS. 4D through 4F illustrate a series of GUIs provided by an electronic device communicatively coupled to an engagement platform, according to various embodiments of this disclosure.

Referring to the non-limiting example of FIG. 4D, a first GUI 450 for obtaining data with which to populate a user profile of a user of an energy generation system, is illustrated. According to various embodiments, an application associated with an engagement platform (for example, Bodhi by 17 TeraWatts) periodically presents a GUI (for example, GUI 450) asking a user if they want to provide data with which the engagement platform can populate a user profile (for example, data associated with one or more behavioral frameworks) for the user, and better personalize the engagement platform's interactions with the user. With reference to the illustrative example of FIG. 4D, the content and format of first GUI 450 may be personalized on existing behavioral framework data in the user profile for a user. In some embodiments the content and format of first GUI may reflect baseline behavioral assumptions (for example, that people don't like intrusive or formally phrased surveys). According to some embodiments, to enhance engagement and between a user and the system, first GUI 450 may include one or more buttons 451 and 453 by which a user can choose to accept or decline the invitation to provide data to populate a user profile. In some embodiments, responsive to tapping button 451, or providing another control input manifesting their agreement to provide data for populating a user profile maintained at an engagement platform, the application presents an intermediate GUI 460, an example of which is illustrated in FIG. 4E.

Referring to the non-limiting example of FIG. 4E, an intermediate GUI 460 according to various embodiments of this disclosure is shown. As shown in this illustrative example, in some embodiments, intermediate GUI 460 comprises a question prompt 461, through which a user can provide a response by pushing a button 463 associated with a first response or a button 465 associated with a second response. According to various embodiments, the user's response to question prompt 461 are used to populate elements of a user profile (for example, a mapping to a personality type) determined at the electronic device presenting GUI 460. In some embodiments, the electronic device sends the populated user profile to the engagement platform to update a user profile maintained at the engagement platform. In certain embodiments, the user's responses to question prompt 461 are sent directly to the engagement platform, which uses them to update a user profile maintained at the engagement platform. According to various embodiments, responsive to a user pressing "Next" button 467, intermediate GUI 460 refreshes and presents a further question prompt to collect data for a user profile. In some embodiments, responsive to a user providing a predetermined number of responses to question prompts, or responsive to a user pressing "Let's take a break" button 469, the user is presented with signoff GUI 470.

Referring to the non-limiting example of FIG. 4F, an example of a signoff GUI 470 according to various embodiments of this disclosure is shown. According to various embodiments, signoff GUI 470 comprises a personalized message 471 to the user, acknowledging their participation in populating a user profile. According to certain embodiments, the user profile is populated and updated in real time, and the content of personalized message 471 is selected based on the application of the updated user profile to an interaction model (for example, interaction model 331 in FIG. 3). In the illustrative example of FIG. 4F, the content of personalized message 471 reflects updated user profile data showing that the user maps to an "explorer" in a behavioral. Had the user's responses to question prompts mapped to a behavior type with different expected motivations, personalized message 471 would contain different content.

FIGS. 5A and 5B illustrate operations of a method 500 of an engagement platform (for example, engagement platform 301 in FIG. 3) according to various embodiments of this disclosure.

Referring to the non-limiting example of FIG. 5, at operation 505, the engagement platform obtains configuration information of an energy generation system (for example, energy generation system 351 in FIG. 3). According to various embodiments, at operation 505, the engagement platform obtains the configuration information (for example, information regarding the identity and properties of components of the energy generation system) by pulling or triggering pushes of information (for example, through one or more APIs of API library 313 in FIG. 3) from an external computing platform (for example, project management software tools 345 utilized by a solar installer).

According to various embodiments, at operation 510, configuration information of the energy generation system is provided to one or more interaction models (for example, interaction model 331 in FIG. 3) in a common representation format. According to various embodiments, the common representation format may be a table within a relational database. Further, in some embodiments, the configuration information is originally provided as unstructured data (for example, as text in a scraped web page), which is put into the common representation format by an engagement mapping wizard (for example, engagement mapping wizard 315 in FIG. 3) or other module of the engagement platform. While not shown in FIG. 5A, according to various embodiments, operation 510 is triggered by another process or module of the engagement platform (for example, triggering function 317 in FIG. 3).

As shown in the illustrative example of FIG. 5A, at operation 515, the engagement platform obtains a present value of the magnitude of the electrical output of the energy generation system. According to some embodiments, the engagement platform is communicatively coupled to one or more sensors (for example, sensors 353 in FIG. 3) of the energy generation system. In certain embodiments, the engagement platform obtains the present value of the magnitude of the electrical output of the energy generation system through an intermediary device, such as, an electronic device (for example, electronic device 361 in FIG. 3, or home digital assistant 371 in FIG. 3).

According to certain embodiments, at operation 520, the engagement platform stores the present value of the magnitude of the electrical output as electrical output data. According to various embodiments, electrical output data comprises one or more time:value pairs in a time series database (for example, energy database 323 in FIG. 3).

Referring to the non-limiting example of FIG. 5A, at operation 525, the engagement platform provides electrical output data to one or models (for example, energy model 333 in FIG. 3) as part of a triggered process to obtain a personalized interaction. According to some embodiments, the electrical output data is converted to a common representation format consumed by the interaction models. In some embodiments, the electrical output data comprises the present value of the magnitude of the electrical output of the user's energy generation system. In various embodiments, the electrical output data comprises additional time-associated data points, including, in some embodiments, electrical output data from other energy generation systems.

Referring to the non-limiting example of FIG. 5B, at operation 530, the engagement platform obtains a user profile associated with the energy generation system. According to various embodiments, the engagement platform obtains the user profile from a data store of user profiles accessible to the engagement platform (for example, user profile database 325 in FIG. 3). In certain embodiments, to improve efficiency, the engagement platform caches one or more user profiles in a readily accessible memory, and refreshes the cached user profiles in response to an indicator (for example, additional user information provided through GUIs 450, 460 and 470 in FIGS. 4D-F) of a change in data in the user profile.

According to various embodiments, at operation 535, the engagement platform provides the user profile associated with the energy generation system to the interaction model in the common representation format of the interaction model, to obtain a personalized interaction to be provided to the user through one or more engagement channels (for example, via one or more of an application on an electronic device, through a home digital assistant, or implementing a change in the energy consumption state of a device powered by the energy generation system).

Referring to the non-limiting example of FIG. 5B, at operation 540, the engagement platform generates a personalized interaction based on the application of configuration information, electrical output data, and user profile data to one or models of an interaction model. According to various embodiments, the personalized interaction may be generated in response to a trigger from triggering functionality (for example, triggering functionality 317 in FIG. 3). According to various embodiments, the triggering functionality triggers the generation of a personalized interaction upon detecting a change in a value of one or more of the configuration information, electrical output data or user profile data. According to some embodiments, the generation of a personalized interaction is triggered by a value of another measured datum (for example, external temperature, current energy consumption, notification of a blackout) satisfying a triggering condition defined by triggering functionality 317. In some embodiments, where generation of a personalized interaction is computationally expensive, personalized interactions may be pregenerated and cached by engagement platform 301, and then transmitted in response to a triggering condition. In this way, certain embodiments can dynamically provide personalized interactions in response to complicated, multivariable triggering conditions.

As shown in the illustrative example of FIG. 5B, at operation 545, the engagement platform transmits the personalized interaction generated at operation 540 to one or more of a home digital assistant or electronic device. According to various embodiments (for example, personalized interaction 411 in FIG. 4A), the transmitted personalized interaction comprises both a communication to a user, as well as a determined control command to a device operating, at least in part, on energy provided by the energy generation system.

FIG. 6 illustrates additional operations of methods of operating an engagement platform (for example, engagement platform 301 in FIG. 3) according to various embodiments of this disclosure. According to certain embodiments, the operations described with reference to FIG. 6 can be performed in addition to, or in lieu of certain operations of other methods (for example, method 500 in FIGS. 5A and 5B) of operating an engagement platform.

According to various embodiments, a method of operating an engagement platform comprises operation 605, wherein the engagement platform obtains behavioral model data (for example, data of a user profile mapping a user to expected behaviors and motivations) through a GUI (for example, intermediate GUI 460 in FIG. 4E) provided by an electronic device communicatively coupled to the engagement platform. According to various embodiments, in addition to obtaining behavioral model data through a GUI provided by the electronic device, the engagement platform may obtain behavioral model data (for example, data showing periods of activity or being out of the home) from one or more sensors (for example, GPS sensor 188 in FIG. 1) of the electronic device.

Referring to the non-limiting example of FIG. 6, methods of operating an engagement platform according to some embodiments of this disclosure include operation 610, wherein the personalized interaction comprises a command to a device, or a controller thereof, to change an energy consumption state (for example, turning the device off, or to a "sleep" mode) of the device. According to some embodiments, the command to the device is provided to the device through an intermediary device, such as a home digital assistant (for example, home digital assistant 371 in FIG. 3). In some embodiments, where the device (for example, certain electric cars) has a network communication interface, the personalized interaction comprising a command to change the energy consumption state of the device is provided from the engagement platform to the device itself.

According to certain embodiments, methods of operating an engagement platform according to certain embodiments of this disclosure include operation 615, wherein an integration engine (for example, integration engine 311 in FIG. 3) are configured to obtain, via a communication interface, as unstructured data, from one or more computing platforms (for example, external platforms 341 in FIG. 3) external to the engagement platform, installation and configuration information of one or more energy generation systems (for example, energy generation system 351 in FIG. 3). As used in this disclosure, the term "unstructured data" encompasses data which is in a format, wherein the values of the data do not map to fields of the data structures (for example, a relational database format used in user profile database 325 or a common representation format used by interaction model 331) used by the engagement platform.

As shown in the illustrative example of FIG. 6, methods of operating an engagement platform according to certain embodiments of this disclosure comprise operation 620, wherein the engagement platform or a module thereof (for example, engagement mapping wizard 315 in FIG. 3) generates structured configuration information of the energy generation system based on the unstructured data obtained at operation 615. According to certain embodiments, structured configuration information is generated by analyzing the unstructured data to generate a mapping of the format of the unstructured data to the fields of the data structures used by the engagement platform, and passing that map to one or more APIs (for example, APIs of API library 313 in FIG. 3) such that natively unstructured installation and configuration information can be automatically collected by the integration engine.

FIG. 7 illustrates operations of an example of a method 700 of operating an electronic device (for example, electronic device 361 in FIG. 3) according to various embodiments of this disclosure.

Referring to the non-limiting example of FIG. 7, at operation 705, the electronic device presents on a display (for example, display 367 in FIG. 3) of the electronic device, a graphical user interface (for example, intermediate GUI 460 in FIG. 4E) of an application (for example, the application shown with reference to FIGS. 4A through 4F) associated with an engagement platform.

According to various embodiments, at operation 710, the electronic device populates the user profile of a user of an energy generation system based on user data obtained at the electronic device. In certain embodiments, the user data is obtained through user interactions with one or more GUIs (for example, through taps on response buttons 463 and 465 in FIG. 4E) provided by the electronic device. According to some embodiments, the user data is obtained through sensors (for example, activity data of the user obtained by motion sensors of the electronic device, such as IMU 182 in FIG. 1) of the electronic device.

Referring to the non-limiting example of FIG. 7, at operation 715, the electronic device sends the populated user profile to an engagement platform (for example, engagement platform 301 in FIG. 3) to create or update a user profile (for example, data maintained in a user profile database, such as user profile database 325 in FIG. 3) accessible to the engagement platform.

According to various embodiments, at operation 720, the electronic device receives, via a communication interface (for example, communication unit 110 in FIG. 1), a personalized interaction, wherein the personalized interaction is based, at least in part on the application of the data in the user profile to an interaction model. Further, according to various embodiments, at operation 725, the electronic device outputs the personalized interaction (for example, personalized interaction 411 in FIG. 4A) on a display of the electronic device.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A system comprising:
    an engagement platform comprising a first processor and a first memory, the engagement platform further comprising:
        a database; and
        a communication interface;
    an energy generation system producing an electrical output, the energy generation system comprising:

a solar panel;

an inverter; and an output sensor communicatively coupled to the engagement platform;

a home digital assistant communicatively coupled to the engagement platform; and an electronic device communicatively coupled to the engagement platform, the electronic device comprising a second processor and a second memory containing instructions, which when executed by the second processor, cause the electronic device to provide a graphical user interface (GUI) for the system;

wherein the engagement platform is configured to:

obtain, via the communication interface, configuration information of the energy generation system, provide, to an interaction model implemented by the engagement platform, the configuration information of the energy generation system in a common representation format of the engagement platform, obtain, via the communication interface, from the output sensor, a present value of a magnitude of the electrical output of the energy generation system, store the present value of the magnitude of the electrical output of the energy generation system in the first memory as electrical output data, provide, to the interaction model, the electrical output data in the common representation format of the engagement platform, obtain, from the database, a user profile associated with the energy generation system, provide, to the interaction model, the user profile associated with the energy generation system in the common representation format of the engagement platform, generate a personalized interaction for a user associated with the energy generation system, the personalized interaction based on application of the configuration information of the energy generation system, the electrical output data, and the user profile to the interaction model, and transmit the personalized interaction, via the communication interface, to one or more of the home digital assistant or the electronic device.

2. The system of claim 1, wherein the home digital assistant is communicatively coupled to a smart device powered at least in part by the energy generation system, and wherein the personalized interaction comprises a command to change an energy consumption state of the smart device.

3. The system of claim 1, wherein the user profile includes behavioral model data associated with the user, wherein the behavioral model data associated with the user is obtained through the GUI provided by the electronic device, and wherein the personalized interaction is generated, based in part on application of the behavioral model data to the interaction model.

4. The system of claim 1, further comprising:

an integration engine, wherein the integration engine is configured to obtain, via the communication interface, from one or more computing platforms external to the system, installation information and system information of the energy generation system as unstructured data, and wherein the integration engine is configured to generate structured configuration information of the energy generation system based on the unstructured data.

5. The system of claim 1, wherein the user profile comprises a value of a parameter associated with a user-selected energy generation target, and wherein the personalized interaction is generated based in part on application of the user-selected energy generation target to the interaction model.

6. The system of claim 1, wherein the engagement platform is further configured to:

obtain, via the communication interface, extrinsic data comprising at least one of: configuration information of a second energy generation system, second electrical output data based on measured values of a present electrical output of the second energy generation system, or a second user profile associated with the second energy generation system, provide, to the interaction model, the extrinsic data in the common representation format of the engagement platform, and generate the personalized interaction based in part on application of the extrinsic data to the interaction model.

7. The system of claim 1, wherein the energy generation system further comprises at least one of an electrical storage device, a windmill, or a connection to an external electrical supply.

* * * * *